United States Patent
Hossain et al.

(10) Patent No.: US 8,626,233 B2
(45) Date of Patent: Jan. 7, 2014

(54) METHOD AND APPARATUS FOR FLEXIBLE MULTIPLE NUMBER ASSIGNMENT MODULES

(75) Inventors: Asif Hossain, Kanata (CA); Padakandla Krishna Rao, Cupertino, CA (US)

(73) Assignee: BlackBerry Limited, Waterloo (CA)

( * ) Notice: Subject to any disclaimer, the term of this patent is extended or adjusted under 35 U.S.C. 154(b) by 777 days.

(21) Appl. No.: 12/180,508

(22) Filed: Jul. 25, 2008

(65) Prior Publication Data

US 2010/0022267 A1 Jan. 28, 2010

(51) Int. Cl.
*H04M 1/00* (2006.01)

(52) U.S. Cl.
USPC ......... 455/551; 455/406; 455/465; 455/552.1

(58) Field of Classification Search
USPC ........................................................ 455/551
See application file for complete search history.

(56) References Cited

U.S. PATENT DOCUMENTS

| | | | | |
|---|---|---|---|---|
| 5,249,302 A | * | 9/1993 | Metroka et al. | 455/552.1 |
| 5,675,630 A | * | 10/1997 | Beatty | 455/551 |
| 6,757,268 B1 | * | 6/2004 | Zendle | 370/338 |
| 7,437,158 B2 | * | 10/2008 | Russell | 455/435.2 |
| 2001/0000777 A1 | * | 5/2001 | McGregor et al. | 455/406 |
| 2004/0248595 A1 | * | 12/2004 | Hicks et al. | 455/465 |
| 2006/0116105 A1 | * | 6/2006 | Frankel et al. | 455/406 |
| 2008/0228610 A1 | * | 9/2008 | Kim et al. | 705/34 |
| 2010/0056203 A1 | * | 3/2010 | Hicks et al. | 455/552.1 |

* cited by examiner

*Primary Examiner* — Fayyaz Alam
*Assistant Examiner* — David Bilodeau
(74) *Attorney, Agent, or Firm* — Moffat & Co.

(57) ABSTRACT

A method and apparatus for configuring a mobile device capable of supporting multiple number assignment modules, the method writing a first configuration parameter to indicate whether the mobile device should support multiple number assignment modules; specifying a second configuration parameter to indicate whether the mobile device should support data connectivity on a second or subsequent number assignment module; and setting a third configuration parameter to indicate whether separate billing should occur for data usage on the multiple number assignment modules. Also, a method and apparatus for data connectivity on a mobile device supporting multiple name assignment modules, the method checking, subsequent to transitioning to a second name assignment module, whether the second name assignment module supports data connectivity; responsive to the checking, determining whether separate billing is required for the second name assignment module; and responsive to the determining, establishing a data connection.

15 Claims, 4 Drawing Sheets

METHOD AND APPARATUS FOR FLEXIBLE MULTIPLE NUMBER ASSIGNMENT MODULES

FIELD OF THE DISCLOSURE

The present disclosure relates to multiple number assignment modules or alternative line services, and in particular to data services for multiple number assignment modules or alternative line service enabled mobile devices.

BACKGROUND

A number assignment module (NAM) is a memory storage in a mobile device which stores a telephone number and an electronic serial number. Phones with dual or multi NAM features offer users the option of registering the phone with more than one number. For example, this could be registering the phone with a local number in two separate markets.

Dual NAMs or alternative lines services have been available in code division multiple access (CDMA) and global systems for mobile communications (GSM) products for some time. For example, on CDMA products each NAM has its own mobile directory number (MDM), preferred roaming list (PRL), and other associate non-volatile memory items including the international mobile subscriber identity (IMSI) which makes the mobile device appear as a separate or a different subscriber to the network for billing purposes. This differentiation applies to voice services not to data services.

For data billing, data credentials such as the session initiation protocol (SIP) and a network layer protocol called mobile internet protocol (MIP) username and password are used. Further, an access node (AN) username/password for evolution-data optimized networks can be used.

Current implementations of non-volatile memory support only one number assignment module storage space for data credentials. Due to this limitation the mobile would have to use the first data credentials even though the user had switched to the second NAM (NAM2), thus causing the network to bill the NAM2 user for all voice services but still bill the first NAM (NAM1) subscriber for data services.

In addition, not all carriers and their customer's require the dual NAM features on their handset. For example, carrier A may not want this feature on any of their handsets, whereas carrier B may want the feature on some of their handsets where specific customers require the advanced feature. Further, a first customer on the second carrier may want to have dual NAM functionality with separate data billing for each NAM while a customer B on the second carrier may want all data billed to NAM1 only.

BRIEF DESCRIPTION OF THE DRAWINGS

The present disclosure will be better understood with reference to the drawings in which.

DETAILED DESCRIPTION

The present disclosure provides a solution to incorporate a flexible dual NAM feature. The flexibility includes various components including dual NAM support, data service permissible on NAM2 inquiries, and separate data billing, as described in detail below.

Dual/multiple number assignment modules, or alternative line services (ALS) are used interchangeably herein and are not meant to limiting to one term or the other. Further, the use of dual number assignment modules is meant for illustration purposes and the present disclosure could equally apply to multiple number assignment modules.

The present disclosure therefore provides a method for configuring a mobile device capable of supporting multiple number assignment modules comprising: writing a first configuration parameter to indicate whether the mobile device should support multiple number assignment modules; specifying a second configuration parameter to indicate whether the mobile device should support data connectivity on a second or subsequent number assignment module; and setting a third configuration parameter to indicate whether separate billing should occur for data usage on the multiple number assignment modules.

The present disclosure further provides a method for data connectivity on a mobile device supporting multiple name assignment modules comprising: checking, subsequent to transitioning to a second name assignment module, whether the second name assignment module supports data connectivity; responsive to the checking, determining whether separate billing is required for the second name assignment module; and responsive to the determining, establishing a data connection.

The present disclosure further provides a mobile device configured for flexible data connectivity with multiple name assignment modules, the mobile device comprising: memory having a first configuration parameter to indicate whether the mobile device should support multiple number assignment modules, a second configuration parameter to indicate whether the mobile device should support data connectivity on a second or subsequent number assignment module; and a third configuration parameter to indicate whether separate billing should occur for data usage on the multiple number assignment modules; a communications subsystem; and a processor configured to: check, subsequent to transitioning to a second name assignment module, whether the second name assignment module supports data connectivity; responsive to the checking, determine whether separate billing is required for the second name assignment module; and responsive to the determining, establish a data connection over the communications subsystem.

The present disclosure provides for a flexible dual or multiple NAM feature. This feature is described with regard to both configuration and use on a mobile device.

Configuration

Figure 1:
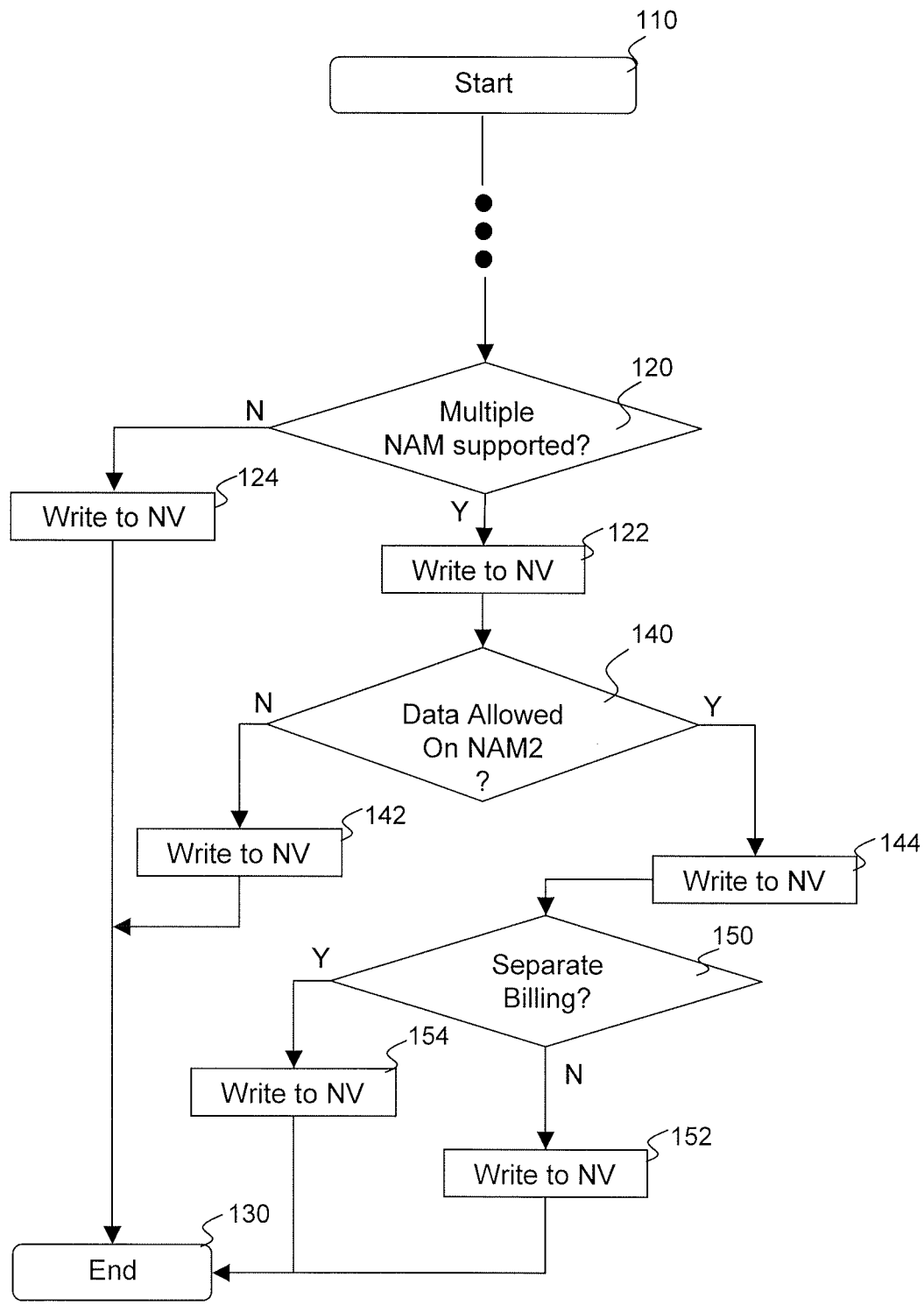
FIG. 1 is a data flow diagram showing configuration of a mobile device for flexible multi number assignment module.

Reference is now made to FIG. 1. In FIG. 1, configuration of the mobile device is started at block 110 and proceeds through standard configuration steps. As will be appreciated, configuration can occur at the factory when the device is created or at a point of sale, for example. In other embodiments configuration could also occur after sale by re-provisioning the device, for example at a carrier's sales outlet.

In addition to standard configuration, the process includes a block 120 in which a check is made to determine whether dual or multiple NAMs should be supported by the mobile device. The determination could be based on a carrier wide policy regarding whether to support multiple NAMs, a policy for the particular type of device or based on the customer purchasing the device.

As will be appreciated, if dual or multiple NAMs are supported, a user has the choice of switching between the NAMs.

Otherwise, if the feature is disabled, the user may not have a user interface accessibility to change the NAM.

If, in block 120, it is determined that dual or multiple NAMs should not be supported the process proceeds to block 124 in which the configuration setting of not permitting multiple NAMs is written to a non-volatile memory item and the process then proceeds to block 130 and ends.

Conversely, if in block 120 it is determined that dual or multiple NAMs should be supported the process proceeds to block 122 in which the configuration parameter indicating the allowance of dual or multiple NAM support is written to a non-volatile memory location. As will be appreciated, in CDMA and EVDO networks, rather then using a SIM card the information about network access may be stored in non-volatile memory locations.

From step 122 the process is then configured to proceed to a second aspect of configuration. Specifically, the process proceeds to block 140 in which a check is made to determine whether data service is permissible on the second or subsequent NAM. This check in block 140 defines whether a user who has switched to NAM2, for example, will be permitted to access data.

If data is not permissible, as determined in block 140, then the configuration information is specified for the non-volatile memory in block 142 and the process proceeds to block 130 and ends.

As will be appreciated, if data is disabled by being non-permissible in block 140, no data service is available when the mobile device is on NAM2, for example, and this is the equivalent to having data service turned off From block 140, if data is permitted on NAM2 or subsequent NAMs the process then proceeds to block 144 in which the configuration setting is specified for the non-volatile memory and the process then proceeds to the third aspect of the configuration.

Specifically, the third aspect of the configuration determines how billing should be handled concerning data on NAM2 or subsequent NAMs. Various options exist, including having a separate bill generated for data use on NAM2 or grouping the data usage for NAM2 and NAM1 under a single bill.

The process proceeds to block 150 in which a determination is made concerning whether separate billing should be used. If no, the process proceeds to block 152 in which this configuration option is set at the non-volatile memory. Subsequently, when a user is connecting to a data source the mobile device will use the same credentials as in NAM1 for data connectivity and these credentials are created from the non-volatile memory. The process then proceeds to block 130 and ends.

Conversely, if the process in block 150 determines that separate data credentials, and thus separate billing, are to be used, the process proceeds to block 154 in which the configuration is set at the non-volatile memory. The process then proceeds to block 130 and ends.

In one embodiment, new credentials for data connectivity from NAM2 can be written into non-volatile memory as well.

In alternative embodiments it may be desirable to not create new non-volatile memory items for separate configuration credentials. This may avoid non-volatile memory mismatches between chip manufacturers and mobile device manufacturers. In this case, an on-the-fly technique can be used to modify the credentials.

Credentials for data connectivity are typically in the format of MDN@domainname. Carriers use different ways to differentiate between different data types. For example, on-device data usage may be treated differently than if the device was used as a tethered modem. In one case, the carrier may bill the on-device data usage differently from data received when the device is being used as a modem.

Specifically, if a carrier uses a different mobile IP (MIP) network access identifier (NAI) to differentiate between data types or if the carrier adds an extra string to a domain to differentiate the separate data types, the domain name can be modified at the time of data connectivity.

Thus, the carrier may use credentials MDN1@mip.1x.carrier.com for modem usage and MDN1@device.1x.carrier.com for on-device data usage. In this case, for NAM2 the credentials could be modified on-the-fly in random access memory (RAM) to replace MDN1 with MDN2. The substituted credentials could look like MDN2@mip.1x.carrier.com for modem usage and MDN2@device.1x.carrier.com for on-device data usage. Similarly, if the carrier appends an extra string to the domain to differentiate the modem then the credential MDN1@carrier.com could be used for on-device data usage and MDN1@modem.carrier.com could be used for modem usage. The credential could be modified on-the-fly for NAM2 by using MDN2@carrier.com and MDN2@modem.carrier.com for on-device and modem usage respectfully.

In a further embodiment, credentials could be supplied by personal computer software for modem usage. Such supplied credentials are used in the case where the modem software on the device is configurable by a user to provide the connectivity parameters. When the parameters are provided by a user, a policy could be implemented to utilize the credentials supplied by the PC software regardless of whether NAM1 or NAM2 is being used. In other words, no modification of credentials occurs for modem data whenever these are supplied by the PC. Conversely, on-device data usage could still change from MDN1 to MDN2 on-the-fly in RAM.

As will be appreciated, the above three aspects of configuration, namely configuring whether multiple NAMs are permitted, configuring whether a second or subsequent NAM is allowed data connectivity, and configuring billing for data connectivity on second or subsequent NAMs, provide for increased flexibility for carriers. The carriers could configure the mobile device based on the needs of the carrier and of each individual consumer.

The configuration above can occur utilizing any standard configuration tools.

Use

Figure 2:
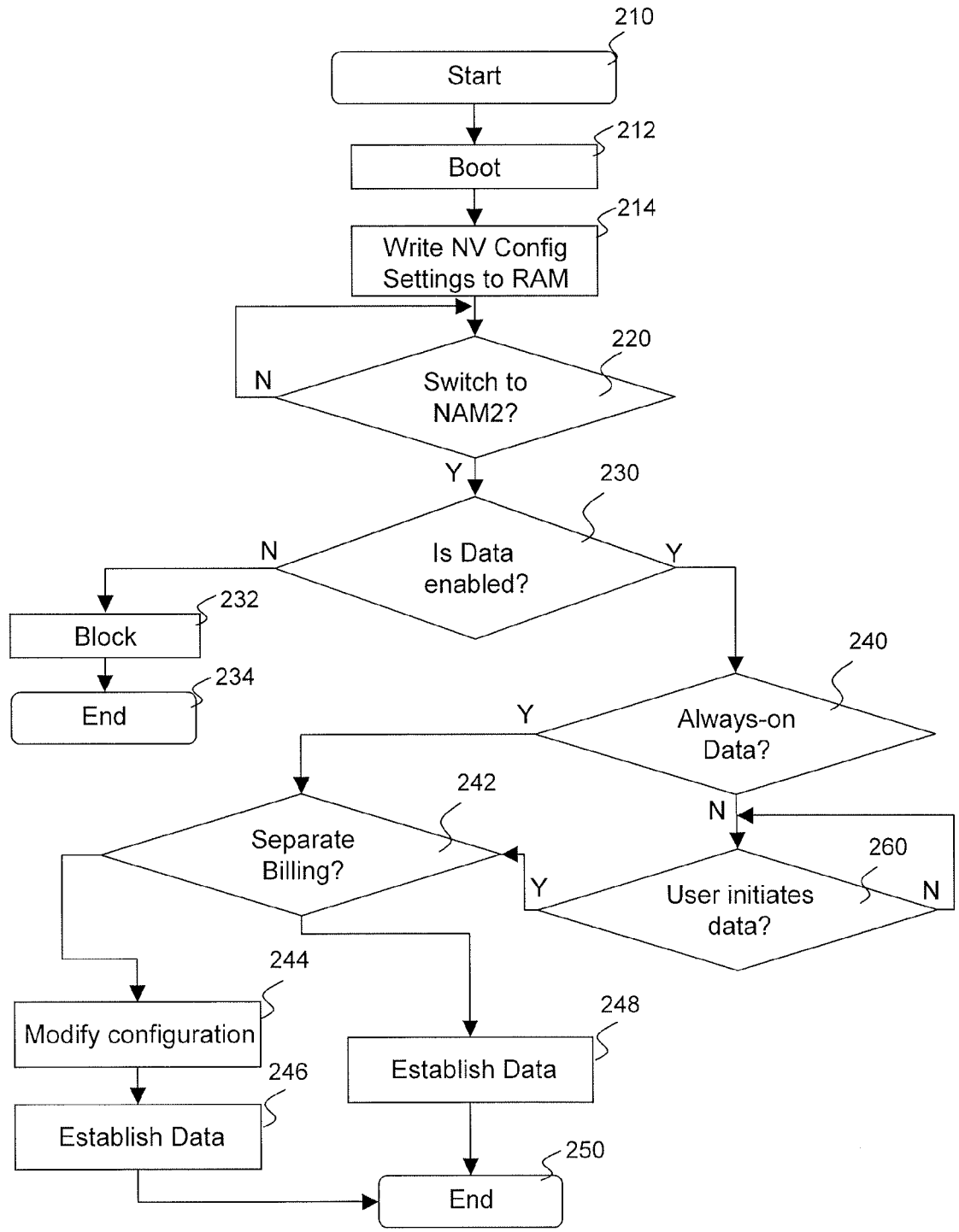
FIG. 2 is a data flow diagram showing implementation of the configuration on a mobile device.

Reference is now made to FIG. 2. FIG. 2 shows a process for the use of a mobile device that has been configured as shown in FIG. 1 above.

A dual NAM device may be used, for example, by a user who has a mobile device provided by his or her employer. During the day the user can use NAM1 and receive voice and data with this identity. In the evening, the user can switch to NAM2 which allows the user to use the mobile device for personal voice calls and thus eliminates the need to have a second mobile device for this purpose. In some cases data may also be permitted on NAM2.

The process of FIG. 2 starts at block 210 and proceeds to block 212 in which the device is booted. During booting, the process writes the configuration settings from the non-volatile memory into RAM as illustrated in block 214.

The process then proceeds to block 220 in which a check is made to determine whether a user has switched to NAM2. As will be appreciated, the switch to NAM2 is merely an example, and the process is equally applicable to switching the device to NAM3, NAM4, etc.

From block 220, if the user has not switched to NAM2, the process continues to loop on step 220 and check whether a switch has been made.

In the alternative, block 220 may be used to determine whether the mobile device can proceed to NAM2. For example, if the configuration of the NV parameter for whether a device is allowed to have multiple NAMs is set to false, the process may instead end after the check at block 220. In this case the user interface for accessing a second NAM could be disabled.

Once the user has switched to NAM2 the process proceeds to block 230 in which a check is made to determine whether data is enabled for NAM2. If no, the process proceeds to block 232 in which an optional operation is performed to prohibit access to data applications by a user. For example, the user interface of the mobile device may be altered to prevent the user from accessing a browser or email application when no data is permitted. This step is optional since other ways of preventing data transfer include prompting or warning a user when the user attempts to use a data application or merely showing no data connectivity when the user accesses an application.

From block 232 the process proceeds to block 234 and ends.

If, in block 230, it is determined that data is enabled on the device for NAM2 the process proceeds to block 240 in which a check is made to determine whether always-on data applications exist on the device. If yes, the process proceeds to block 242 in which the RAM is checked to determine whether the NV parameter requiring separate billing has been set to true.

From block 242, if separate billing is required the process proceeds to block 244 in which the configuration parameters are changed on-the-fly, as described above. The process then proceeds to block 246 in which a data connection is established utilizing the modified data configuration parameters.

From block 242, if separate billing is not required, the process proceeds to block 248 in which a data connection is established utilizing the credentials from NAM1.

From block 246 or block 248 the process proceeds to block 250 and ends.

From block 240, if always-on data is not required the process proceeds to block 260 in which a check is made to determine whether the user or the network has initiated a data connection. If no, the process continues to loop at block 260 until the user or network attempts to initiate a data connection.

Once user or network has attempted to initiate a data connection in block 260 the process proceeds to block 242 to determine whether separate billing is required.

The above therefore illustrates the use of the non-volatile memory configuration parameters by the mobile device in determining whether a user is allowed to change a mobile device's identity, whether a data connection is allowed in the new identity, and how to establish a data connection.

The description above uses terminology for CDMA and EVDO networks. The principles are however the same for other network types. For example, in GSM a separate APN could be used for each ALS. In this way data connectivity parameters and setting could be determined when the user changes to a different ALS. Further the carrier could specify whether separate billing or the same billing is used for data when the user switches between different ALS. The present disclosure is thus meant to include any network type that supports multiple identities on a mobile device.

The above can be implemented on any mobile device and in any network. An exemplary CDMA/EVDO network is illustrated below with regard to FIG. 3 and an exemplary mobile device on which the above is implemented is illustrated with regard to FIG. 4.

Figure 3:
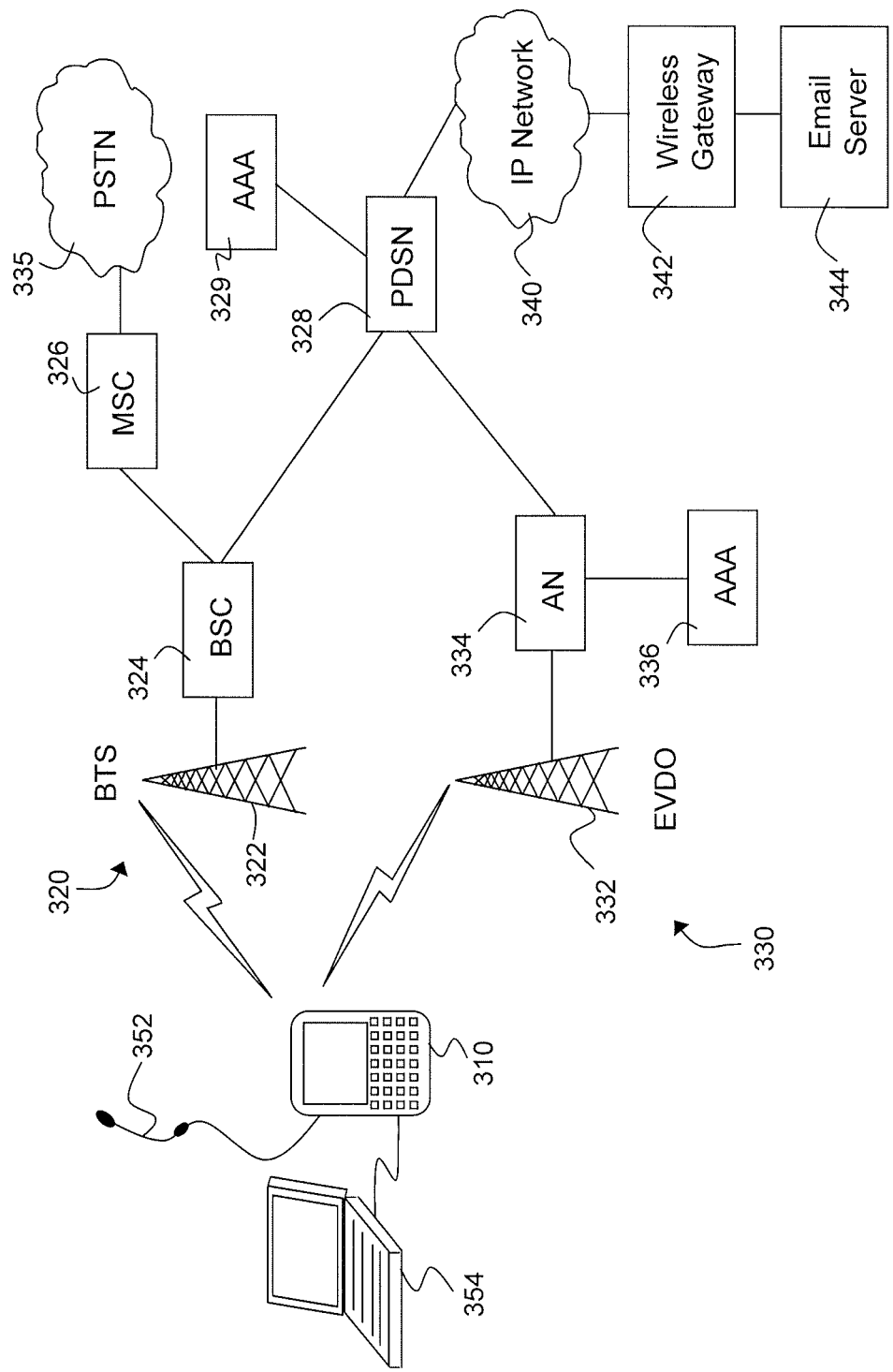
FIG. 3 is a block diagram of an exemplary CDMA/EVDO system architecture.

Reference is now made to FIG. 3. FIG. 3 is a block diagram of an exemplary wireless data network in accordance with the present application and with which the various embodiments of the method of the instant application may cooperate. FIG. 3 shows a block diagram of a wireless data device 310 and exemplary CDMA 1x network 320, an exemplary EVDO network 330, a public switched telephone network (PSTN) 335, a data network 340, wireless gateway 342 and e-mail server 344 with which the instant techniques of this application may cooperate. The wireless data device 310 is preferably a two-way communication device having data and voice communication capabilities.

CDMA network 320 is comprised of a base transceiver station (BTS) 322 and a base station controller (BSC) 324. Base station controller 324 communicates with a mobile switching centre 326 which, as will be appreciated, is a circuit switched only component communicating with PSTN 335. Base station controller 324 further communicates with a packet data serving node (PDSN) 328 which is a packet switched only component. PDSN 328 further communicates with IP network 340.

EVDO network 330 contains an EVDO sector 332 which communicates with access node (AN) 334. Since the EVDO network 330 is a data only network, access node 334 communicates only with PDSN 328 and not with any circuit switched components.

An authentication, authorization and accounting node 336 is associated with AN 334, and a similar node 329 is associated with PDSN 328.

Operationally, mobile device 310 communicates wirelessly with CDMA network 320 using BTS 322 and BSC 324 to gain access to the CDMA 1x network. As indicated above, the CDMA 1x network is given priority and the establishment of the CDMA network occurs prior to any EVDO network connection being established.

Mobile device 310 sends and receives both data and voice services through CDMA network 320 until an EVDO network connection is established. Base station controller 324 communicates with circuit switched services provided by mobile switching center (MSC) 326 such as voice and short message service (SMS) via PSTN 335.

Prior to an EVDO connection being established, mobile device 310 further communicates wirelessly with BTS 322 and BSC 324 to gain access to packet data services provided by PDSN 328, such as e-mail, wireless application protocol (WAP) and other data services via data network 340. Such services are provided through wireless gateway 342 and servers such as e-mail server 344.

Once a network connection is established with CDMA 1x network 320 and the mobile device enters CDMA 1x idle state, wireless device 310 establishes a connection with EVDO network 330. This is done through EVDO sector 332 and AN 334. In this way, mobile device 310 gains access to packet data services provided by PDSN 328 using EVDO network 330. Subsequent to the establishment of an EVDO network connection with mobile device 310, CDMA network 320 is used to provide circuit switched services such as voice and SMS while EVDO network 330 is used to provide packet data services such as e-mail and WAP.

As will be appreciated by those skilled in the art, wireless device 310 can include voice communication means such as a headpiece 350 or a user can communicate directly into the wireless device 310.

A further advantage of the present system is that due to high transfer rates associated with EVDO networks, wireless device 310 can be used as a wireless modem and be connected through various means such as a USB or other serial port, or by short range wireless communications with a computer 354. Computer 354 can then gain access to data network 340 through EVDO network 330 using mobile device 310 as the modem.

Figure 4:
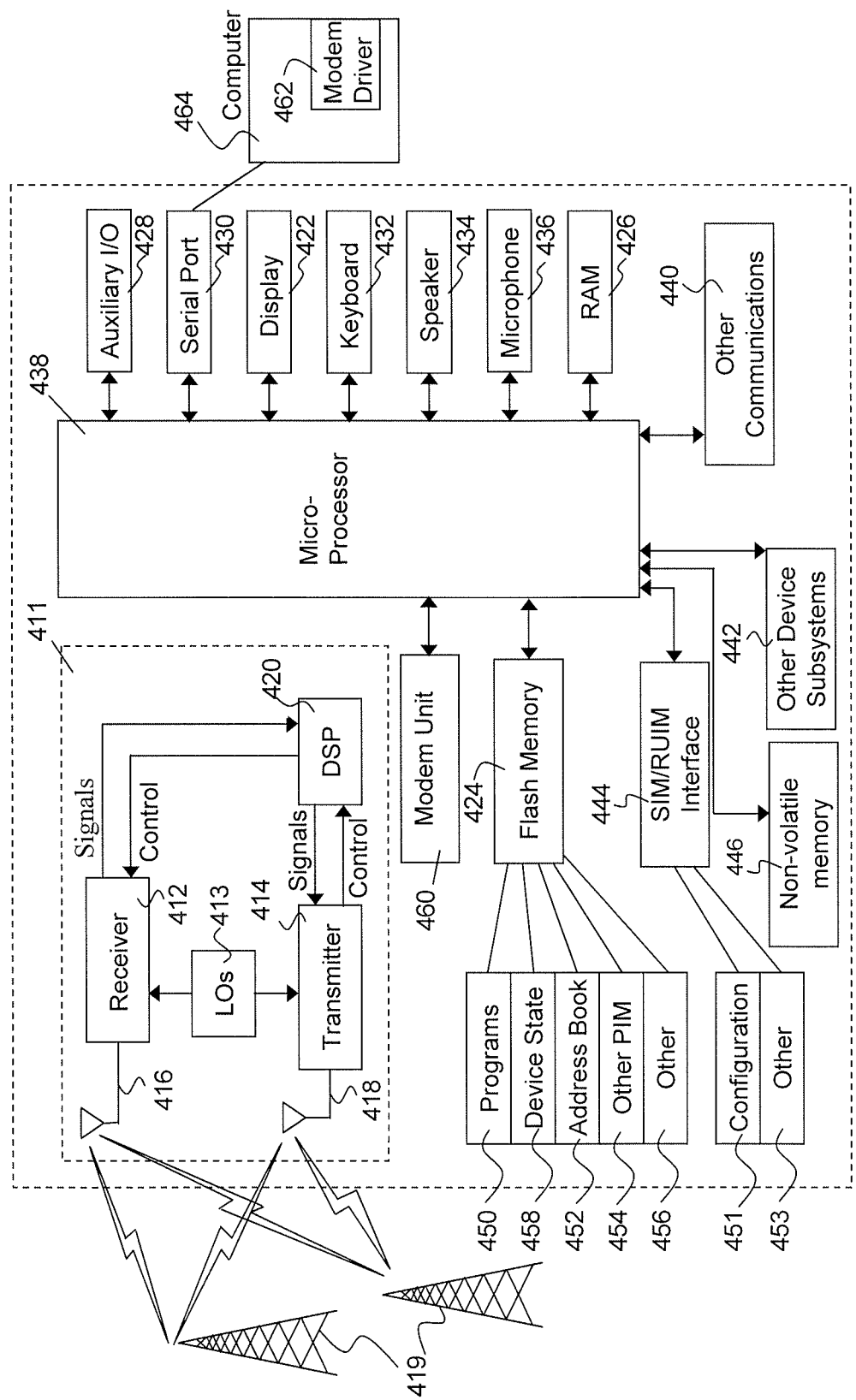
FIG. 4 is a block diagram of an exemplary mobile device.

Reference is now made to FIG. 4. FIG. 4 is a block diagram illustrating a mobile device apt to be used with preferred embodiments of the apparatus and method of the present application. Mobile device 400 is preferably a two-way wireless communication device having at least voice and data communication capabilities. Mobile device 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile device 400 may include a communication subsystem 411 designed to operate within the CDMA 1x/EVDO hybrid system.

Network access requirements will also vary depending upon the type of network 419. In some CDMA networks network access is associated with a subscriber or user of mobile device 400. A CDMA mobile device may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can hold many key configuration 451, and other information 453 such as identification, and subscriber related information. In other embodiments the configuration information can be stored in non-volatile memory 446 on mobile device 400.

When required network registration or activation procedures have been completed, mobile device 400 may send and receive communication signals over the network 419. As illustrated in FIG. 4, network 419 can consist of multiple base stations communicating with the mobile device. For example, in a hybrid CDMA 1x EVDO system, a CDMA base station and an EVDO base station communicate with the mobile device and the mobile device is connected to both simultaneously. The EVDO and CDMA 1x base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile device 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, one or more keyboards or keypads 432, speaker 434, microphone 436, other communication subsystem 440 such as a short-range communications subsystem and any other device subsystems generally designated as 442. Serial port 430 could include a USB port or other port known to those in the art.

Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile device. A predetermined set of applications that control basic operations, including at least data and voice communication applications for example, will normally be installed on mobile device 400 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the mobile device user's corresponding data items stored or associated with a host computer system. Further applications may also be loaded onto the mobile device 400 through the network 419, an auxiliary I/O subsystem 428, serial port 430, short-range communications subsystem 440 or any other suitable subsystem 442, and installed by a user in the RAM 426 or preferably a non-volatile store 446 for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile device 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of mobile device 400 may also compose data items such as email messages for example, using the keyboard 432, which is in one embodiment a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile device 400 is similar, except that received signals would preferably be output to a speaker 434 and signals for transmission would be generated by a microphone 436. Alternative voice or audio I/O subsystems, such as a voice message recording subsystem, may also be implemented on mobile device 400. Although voice or audio signal output is preferably accomplished primarily through the speaker 434, display 422 may also be used to provide an indication of the identity of a calling party, the duration of a voice call, or other voice call related information for example.

Serial port 430 in FIG. 4, would normally be implemented in a personal digital assistant (PDA)-type mobile device for which synchronization with a user's desktop computer (not shown) may be desirable, but is an optional device component. Such a port 430 would enable a user to set preferences through an external device or software application and would extend the capabilities of mobile device 400 by providing for information or software downloads to mobile device 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem. A modem unit 460 interacts with a driver 462 in a computer 464 to allow data transfer through the mobile device. With EVDO networks, a high rate of data transfer can be achieved using the mobile device 400 as the modem. Depending on the interface provided by driver 462, unit 460 could be an IP routing module. Further, driver 462 could provide either a modem interface or alternatively an IP interface to computer 464. As will be appreciated by those skilled in the art, the combination of driver 462 and unit 460 must provide a communication interface for computer 430 to be enabled for communications originated and/or terminated at computer 430.

Other communications subsystems 440, such as a short-range communications subsystem, is a further optional component which may provide for communication between mobile device 400 and different systems or devices, which need not necessarily be similar devices. For example, the subsystem 440 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for configuring a mobile device capable of supporting multiple number assignment modules comprising:

writing a first configuration parameter to indicate whether the mobile device should support multiple number assignment modules located on said mobile device, each number assignment module providing registration, with a network, of a separate telephone number for billing of wireless voice services, the mobile device is a dual mode device and capable of supporting both wireless voice services in a wireless voice communication mode and wireless data services in a wireless data communication mode;

providing a non-volatile memory having a single storage space to store data credentials for the wireless data service in the wireless data communication mode, the credentials associated with a first of said number assignment modules, wherein billing of the wireless data services from said mobile device is associated with said stored data credentials;

specifying a second configuration parameter to indicate whether the mobile device should support wireless data service connectivity on a second or subsequent of said number assignment modules; and setting a third configuration parameter to indicate whether separate billing should occur for wireless data service usage on the second or subsequent of the multiple number assignment modules checking, subsequent to transitioning to a second of said number assignment modules, whether the second number assignment module supports wireless data service connectivity;

responsive to the checking, determining whether separate billing is required for wireless data services oil the second number assignment module; and responsive to the determining, establishing a wireless data connection using data credentials of said second number assignment module.

2. The method of claim 1, wherein the first configuration parameter, second configuration parameter and third configuration parameter are in non-volatile memory on the mobile device.

3. The method of claim 1, wherein the method is performed during manufacture of the mobile device.

4. The method of claim 1, wherein the method is performed at a point of sale of the mobile device.

5. A method for data service billing on a mobile device comprising:

supporting multiple number assignment modules on said mobile device, each number assignment module providing registration, with a network, of a separate telephone number for billing of wireless voice services, the mobile device is a dual mode device and capable of supporting both wireless voice services, in a wireless voice communication mode and wireless data services in a wireless data communication mode;

providing a non-volatile memory having a single storage space to store data credentials for the wireless data service in said wireless data communication mode, the data credentials associated with a first of said number assignment modules, wherein billing of the wireless data services to said mobile device is associated with said stored data credentials;

checking, subsequent to transitioning to a second of said number assignment modules, whether the second number assignment module supports wireless data service connectivity; responsive to the checking, determining whether separate billing is required for wireless data services on the second number assignment module; and responsive to the determining, establishing a wireless data connection using data credentials of said second number assignment module.

6. The method of claim 5, wherein the checking uses a parameter set in a non-volatile memory location to check whether the second name assignment module supports data connectivity.

7. The method of claim 5, further comprising blocking access to data applications if said second name assignment module does not support data connectivity.

8. The method of claim 5, wherein said determining uses a parameter set in a non-volatile memory location to determine whether separate billing is required.

9. The method of claim 5, wherein said establishing uses credentials from a first name assignment module to establish the data connection if separate billing is not required.

10. The method of claim 5, wherein said establishing changes credentials from a first name assignment module to a second name assignment module automatically if separate billing is required, the changed credentials being used to establish the data connection.

11. The method of claim 10, wherein the changing is done in random access memory.

12. The method of claim 10, wherein the credential is a mobile internet protocol network access indicator.

13. The method of claim 10, wherein the credential is a domain name.

14. The method of claim 10, wherein the establishing uses credentials received from a personal computer without changing the credentials.

15. A mobile device configured for flexible data connectivity with multiple number assignment modules (NAM) comprising:

multiple number assignment modules, each NAM providing registration, with a network, of a separate telephone number for billing of wireless voice services, the mobile device being a dual mode device and capable of supporting both wireless voice services in a wireless voice communication mode and wireless data services in a wireless data communication mode;

non volatile memory having a single storage space for NAM data credentials for the wireless data service in the wireless data communication mode, the data credentials used for billing of said wireless data service; the non volatile memory having a first configuration parameter to indicate whether the mobile device should support said multiple number assignment modules, a second configuration parameter to indicate whether the mobile device should support wireless data service connectivity on a second or subsequent of said number assignment modules; and a third configuration parameter to indicate whether separate billing should occur for wireless data service usage on the multiple number assignment modules;

a communications subsystem; and a processor configured to:
check, subsequent to transitioning to a second name assignment module, whether the second name assignment module supports wireless data service connectivity;

responsive to the checking, determine whether separate billing is required for the second number assignment module; and responsive to the determining, establish a wireless data service connection over the communications subsystem using data credentials of said second number assignment module.

* * * * *